Aug. 26, 1930.  E. MURPHY  1,774,450
CANE HARVESTER
Filed Sept. 26, 1927  7 Sheets-Sheet 1

Inventor
E. Murphy,
Wilkinson & Giusta
Attorneys

Aug. 26, 1930.  E. MURPHY  1,774,450
CANE HARVESTER
Filed Sept. 26, 1927  7 Sheets-Sheet 2

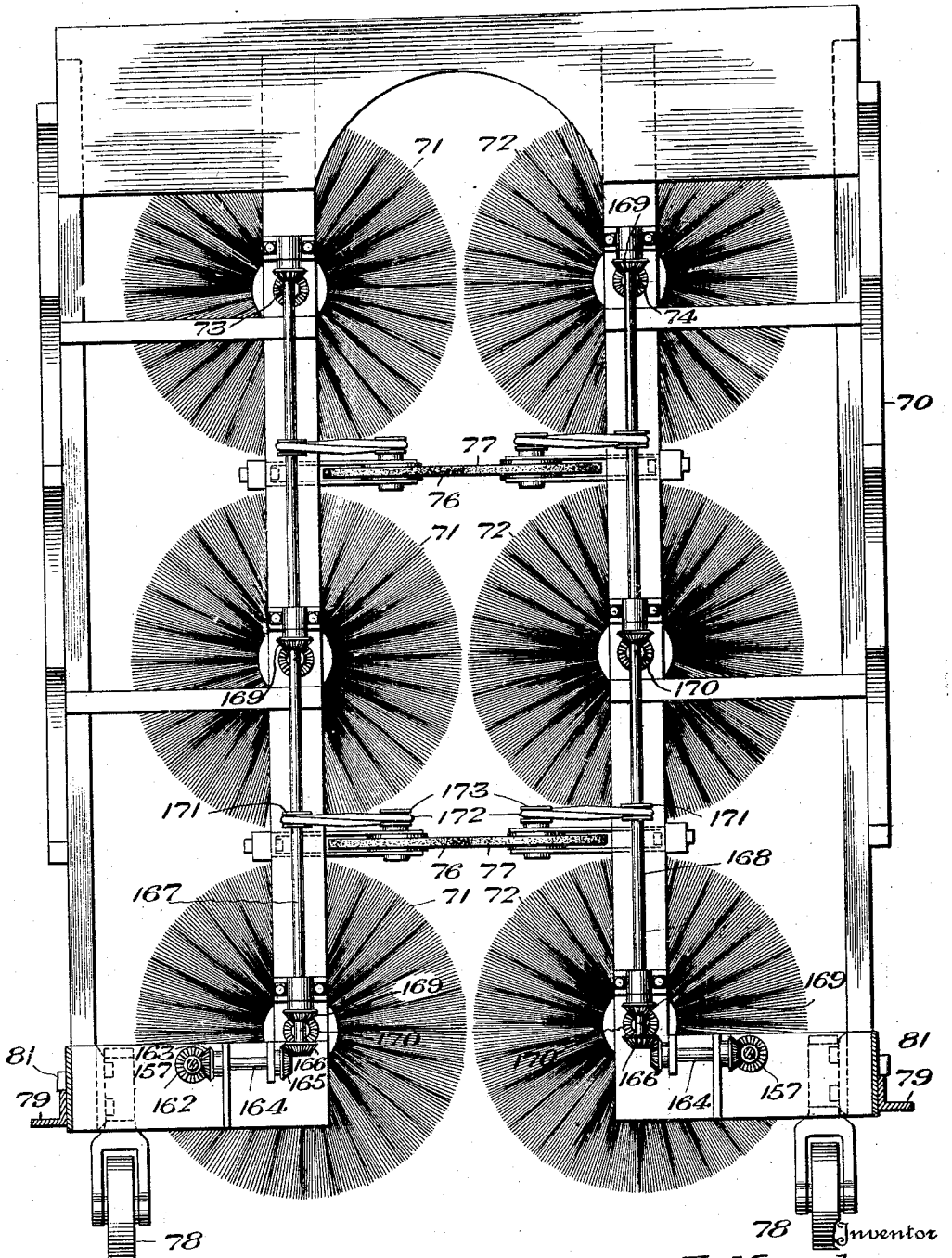

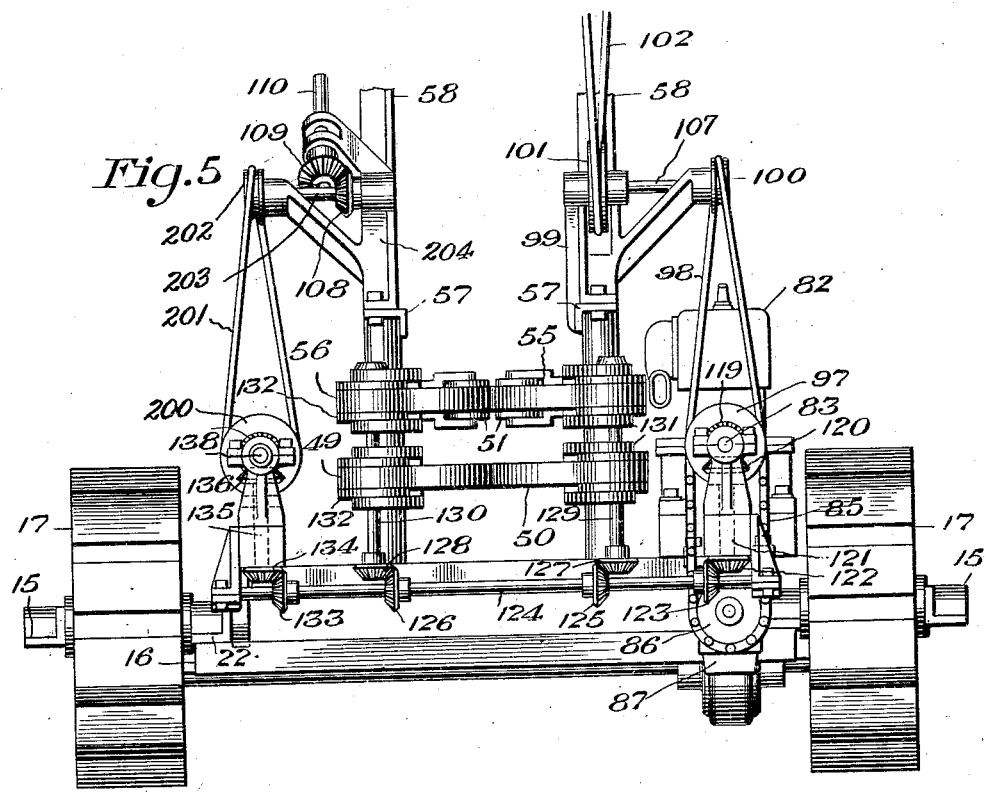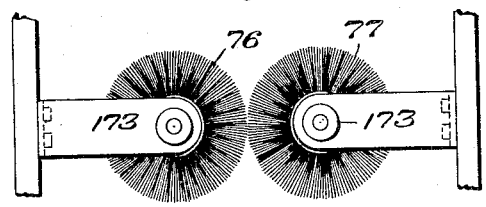

Aug. 26, 1930.  E. MURPHY  1,774,450
CANE HARVESTER
Filed Sept. 26, 1927  7 Sheets-Sheet 6

Inventor
E. Murphy
By
Wilkinson & Hinsta
Attorneys

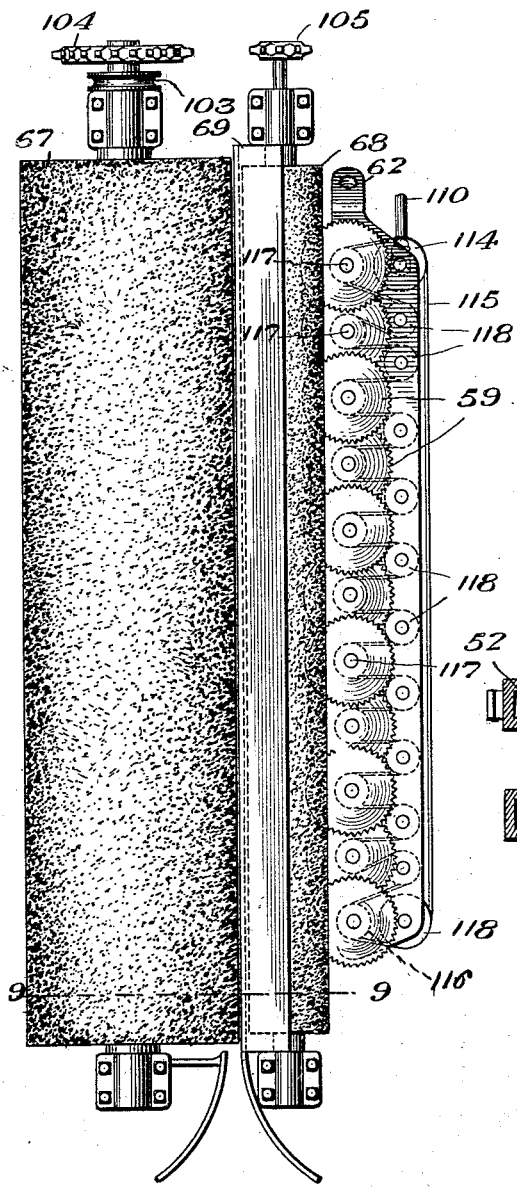
Fig. 8.
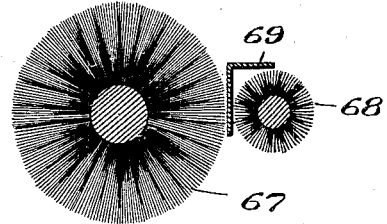
Fig. 9.
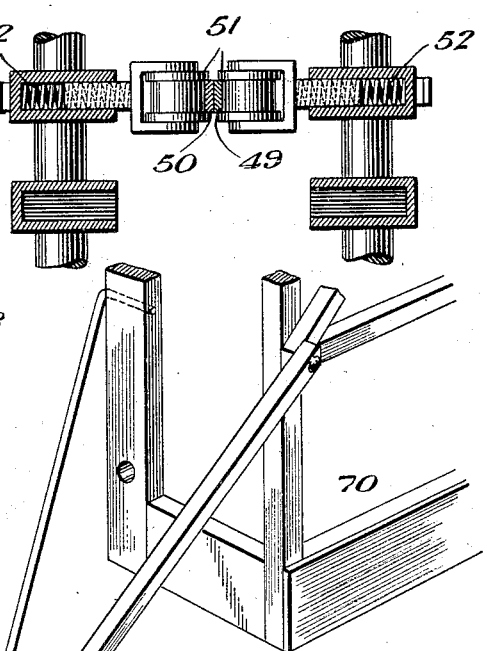
Fig. 10.
Fig. 12.
Inventor
E. Murphy
By Wilkinson & Giusta
Attorneys Patented Aug. 26, 1930

1,774,450

UNITED STATES PATENT OFFICE

EDWARD MURPHY, OF NEW ORLEANS, LOUISIANA

CANE HARVESTER

Application filed September 26, 1927. Serial No. 222,021.

The present invention relates to improvements in cane harvesters, and has for an object to provide an automatic machine for cutting the cane stalks and subsequently topping the same.

Another object of the invention is to provide a simply constructed, compact automatic machine for stripping the leaves from the stalks, severing the stalks and topping the same.

A further object of the invention resides in providing an improved cane harvester constructed and arranged to cut the stalks at a low point to avoid a wasteful high stubble and to remove the tops uniformly a predetermined distance from the bud irrespective of the length of the stalks thus placing the cane immediately without subsequent operations in shape for the mill.

With the foregoing and other objects in view, which will become immediately apparent to those skilled in this art, the invention will be described more particularly hereinafter and more fully pointed out in the appended claims.

In the drawings wherein like parts are denoted by like symbols throughout the several views, Figure 1 is a side elevation of an improved cane harvester constructed according to the present invention.

Figure 4 is a rear elevation of the stripping and stalk holding mechanism.

Figure 5 is a view in rear elevation of the lower portion of the machine.

Figure 8 is a top plan view illustrating a topping mechanism embodied in my machine.

Figure 9 is a transverse sectional view taken on the line 9—9 in Figure 8.

Figure 10 is a fragmentary view in transverse section of conveyor mechanism forming part of the machine.

Figure 11 is a detail view in top plan of cooperating brushes forming a part of a stripping and stalk supporting device embodied in the machine, and Figure 12 is a detail perspective view of a modification in the form of a pilot shoe with which my machine may be equipped.

Referring more particularly to the drawings, 15 designates the longitudinal beams, of which there are two or more, of the main framework, and 16 represents the cross beams which are welded or otherwise attached to the longitudinal beams 15.

Figure 3:
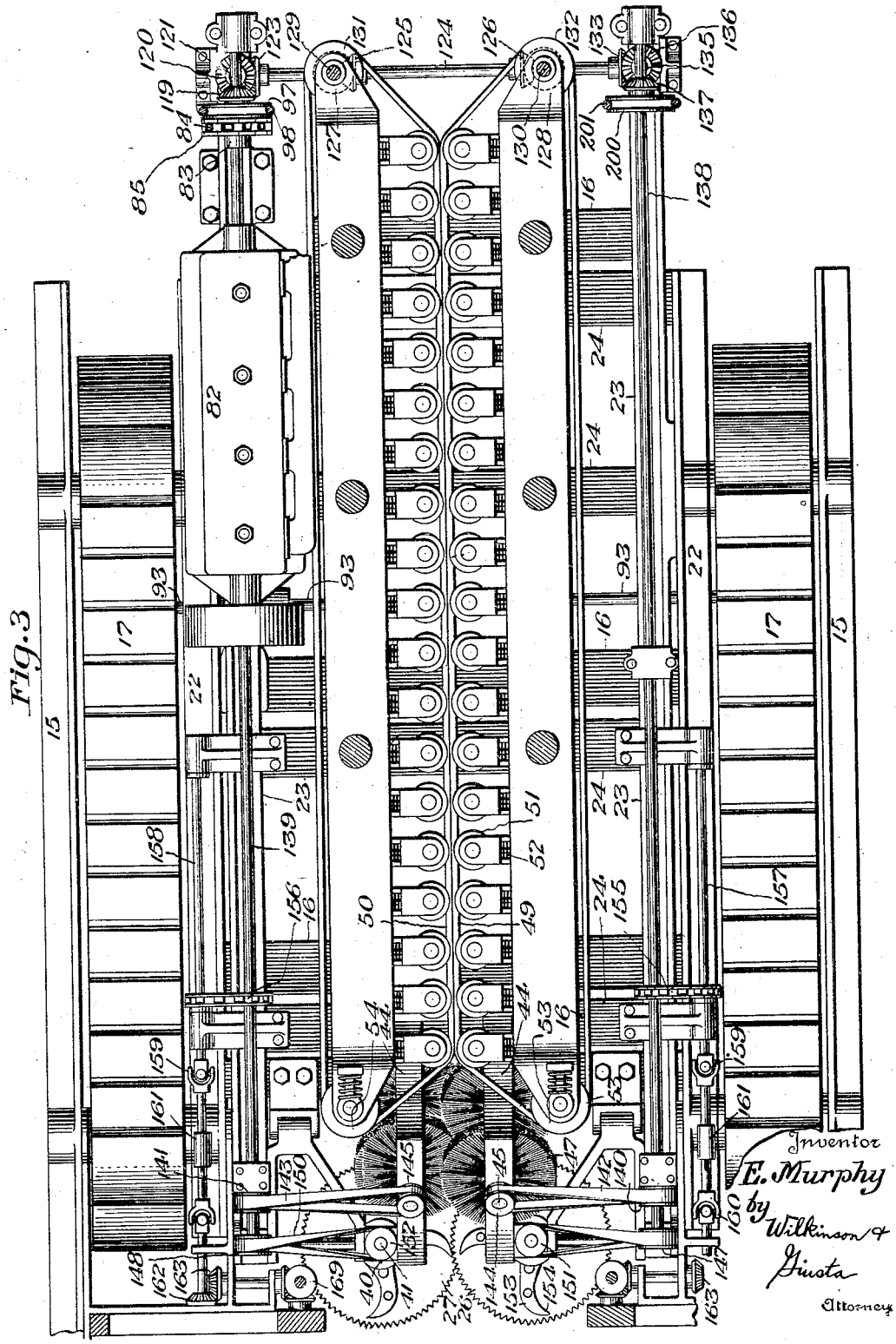
Figure 3 is a top plan view, with the topping mechanism removed and with parts broken away and in section.
Figure 6:
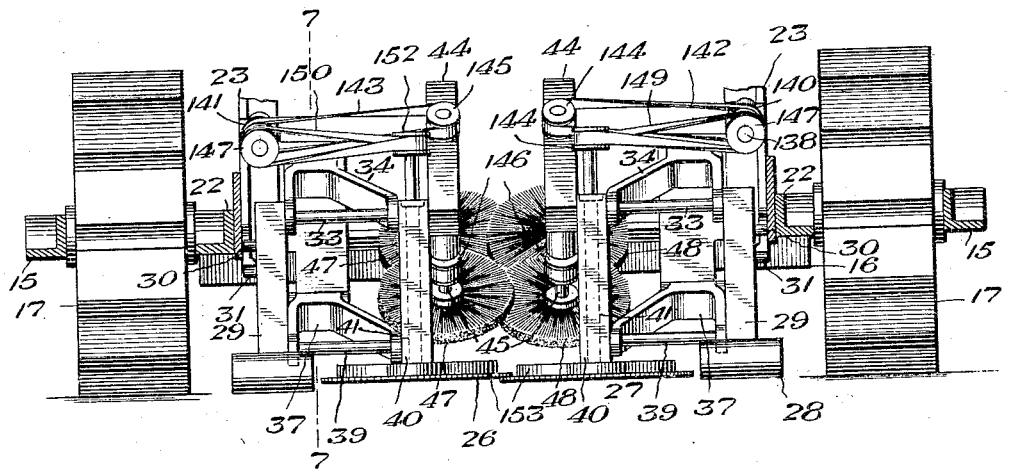
Figure 6 is a view partly in section and partly in front elevation of a portion of the machine.
Figure 7:
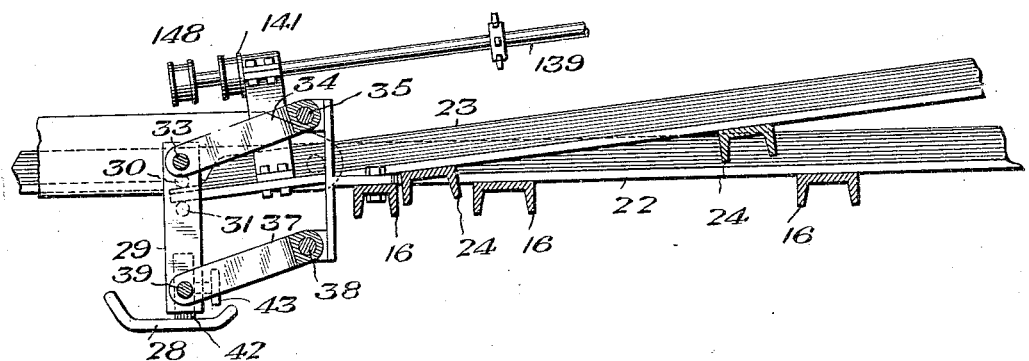
Figure 7 is a longitudinal sectional view taken on the line 7—7 in Figure 6.

The main frame is arranged to be supported for movement upon tractors, for instance the endless tractor belts 17 which are engaged about the rear drive drums 18 and the forward idler drums 19. As shown in Figure 3, preferably two such endless tractors are employed, the shafts 20 and 21 of which may be mounted in appropriate bearings in the longitudinal beams 15 and any other longitudinal beams 22 mounted upon the cross beam 16 just inside of the endless tractors. It will be understood that the shafts 20 and 21 of the tractors are stub shafts which do not extend entirely across the framework, the central portion of which is occupied by a secondary or supplemental frame capable of a rocking movement which would otherwise be impeded were the shafts to extend the entire transverse width of the machine.

The supplemental frame consists in the embodiment shown in the drawings of a number of longitudinal beams 23 connected by cross beams 24.

Figure 2:
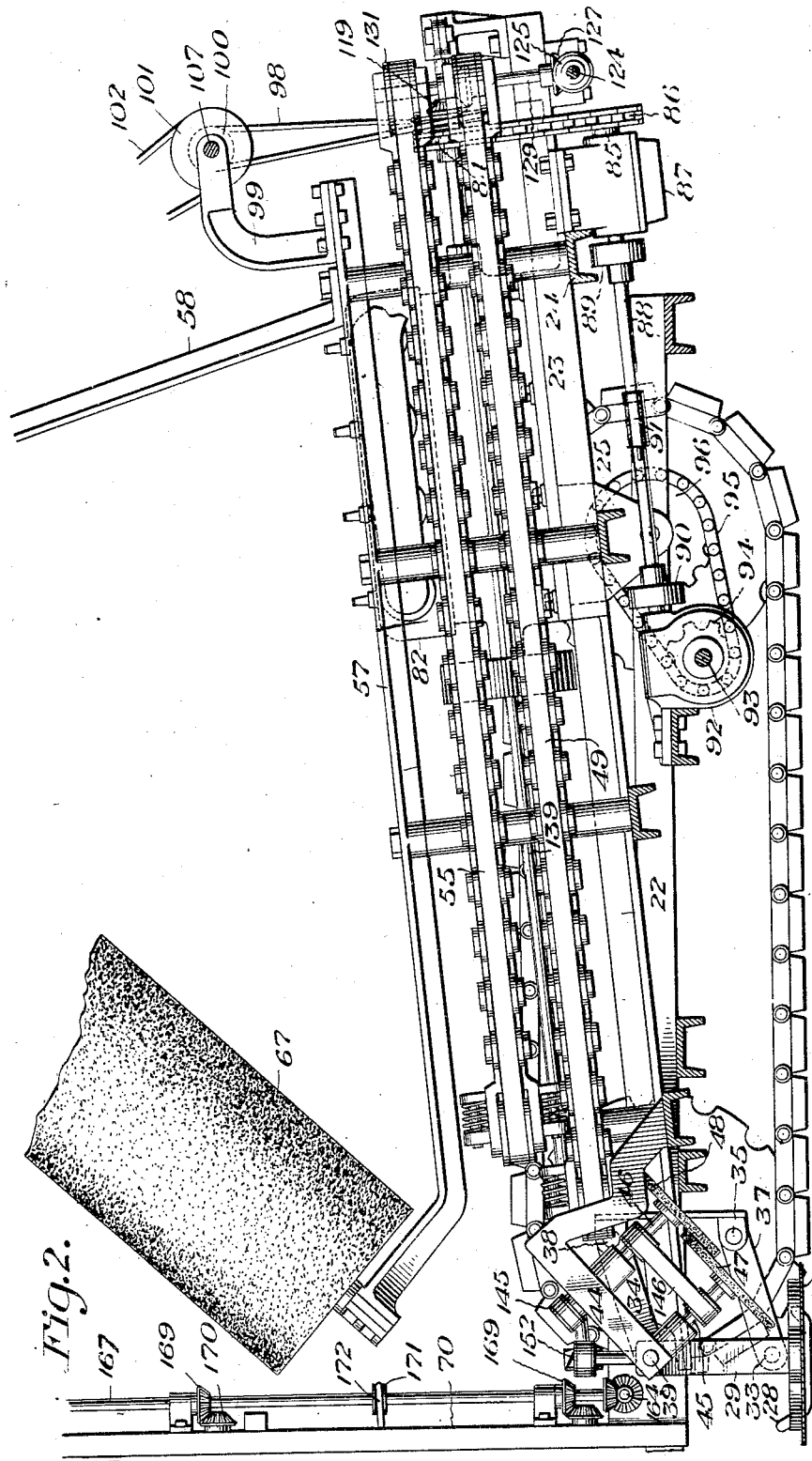
Figure 2 is a fragmentary longitudinal section taken on an enlarged scale.

As shown in Figure 2, the supplemental frame is provided with hangers or bearings 25 upon which it is hung for rocking movement upon the inner portions of the rear stub shafts 20 of the tractors, thus enabling the supplemental frame to rock in a vertical direction upon the main frame, the fulcrum point being located toward the rear to give the front portion of the supplemental frame which carries the rotary saws 26 and 27 an opportunity to rise and fall on a large radius of movement as required in the accommodating of the machine to the irregular contour of the ground over which it moves.

The rotary saws 26 and 27 are preferably in the form of discs being disposed in a generally horizontal plane at the forward central portion of the frames and being overlapped to insure the cutting through of the cane stalk. It is preferred that the cutting discs or saws 26 and 27 be given a slight cant or inclination with their forward edges disposed at a lower level than the rear edges.

I am thus enabled to get a very desirable lead which will facilitate the severing of the stalks and will also dispose the leading edges of the saws at a very low point in the ground, it being my desire to remove as much of the lower surfaces of the saws from contact and friction with the ground over which the machine is passing.

The saws are held at proper horizontal position by means of runners or shoes 28 having upturned front and rear ends to facilitate movement along the ground in either forward or reverse directions. These runners are carried upon posts 29 which extend up and are provided with spaced pins 30 and 31 for engaging respectively above and below the outer reduced ends 32 of the outermost longitudinal beams 23 of the auxiliary frame. The pins require the forward end of the auxiliary frame to ride up and down with the runners 28. The posts 29 are additionally pivoted as indicated at 33 in Figure 2 to hinge plates or links 34. These hinge plates or links 34 are in turn pivoted as indicated at 35 to the main frame. Lower links or hinge plates 37 are pivotally coupled to the main frame at 38 and to the posts 29 at 39. The pivot pins 39 also serve to support the posts 40 through which the shafts 41 of the rotary saws 26 and 27 extend. The runners 28 are carried on shanks 42 fitting up through the posts 29 and having set screws 43 to hold the shanks adjustably in position. In this way the height of the shoes or runners may be adjusted and the degree of penetration of the saws accordingly regulated. Bearing blocks 44 are shown as carried by the forward portion of the supplementary frame above the saws. These bearing blocks incline downwardly and forwardly. Each bearing block carries two shafts, a forward shaft 45 and a rear shaft 46. Front and rear brushes 47 and 48 are mounted upon the lower portions of these shafts, so that the planes of the brushes are diagonal to the plane of the saws. The four brushes are shown in Figure 3.

The front and rear brush of each pair overlap and the front brushes of opposite pairs overlap. These brushes are driven in the same direction as the saws with the near edges moving together rearwardly, whereby to push the cane on to the conveying apparatus. The diagonal arrangement of the brushes will also serve to leave the butt portions of the recently severed cane in position to be grasped between the two adjacent rearwardly moving runs 49 and 50 of the lower conveyor belts which are mounted upon the supplementary frame for travel in a generally horizontal direction. These adjacent runs 49 and 50 of the belts are subjected to strong pressure from rolls 51 under the urge of coil springs 52 or other appropriate means.

The forward bights of the conveyor belts are trained about the spring-pressed idlers 53 and 54. The foremost pair of pressure rolls 51, as shown in Figure 3 are offset backwardly from the transverse line connecting the rollers 53 and 54 to cause the forward portions of the belts to converge rearwardly and to provide a tapering mouth which will guide the butt ends of the stalks between the inner runs of the belts by which they are firmly grasped and moved rearwardly. The rolls 51 may yield locally and individually to accommodate butts of varying diameter and to compensate in general for differences in shape.

Disposed on the supplementary frame and above the lower conveyor belts is a second pair of belts 55 and 56 arranged in a general way similar to the lower belts except that the upper belts are shorter in length and terminate at their front ends a distance to the rear of the front ends of the lower belts 49 and 50, the arrangement being such that the top portion of the stalks shall have become engaged and properly positioned by the brush mechanism to be hereinafter described before the upper conveyor belts take hold. The upper conveyor belts cooperate with the lower conveyor belts in holding the lower portions of the stalks at separated points to prevent the stalks from shifting out of the position after having been released by the topping mechanism.

The topping mechanism is also carried by the supplemental frame and is disposed above the conveyors. A super-structure or topping frame is mounted upon the supplemental frame to support the topping mechanism. This frame consists in general of longitudinal beams 57 suitably supported upon the supplementary frame; and rear standards 58. The rotary topping saws are indicated at 59. These comprise a relatively great number of discs having their edges overlapped and mounted upon a bar 60 which is disposed diagonally. The bar is supported by end brackets 61 and 62. These brackets are adjustably engaged over screw rods 63 and 64 carried by the super-structure. A pair of set nuts 65 and 66 are run upon each of the threaded rods. One nut is disposed above and the other below the bracket, whereby to hold the topping device in the selected vertical position required.

The super-structure also supports a rotary brush 67 of large diameter and a second rotary brush 68, preferably longer than the first mentioned brush but of considerably smaller diameter. A thin bar 69 is disposed between the brushes. The upper portions of the cane stalks are fed between the large brush 67 and the bar 69. It will be noted that the axes of the two brushes are disposed upon substantially the same angle as the bank of topping saws.

Both brushes are rotated in the same direction. As looked at from the top portion in Figure 1 the direction of rotation is clockwise, so that the lower portions of the brushes move toward the topping knives. The topping knives are disposed below the lower edge of the bar 69 and below the smaller brush 68. The brush 68 is disposed adjacent the bar 69 and receives the tops of the cane stalks as they are freed from between the brush 67 and bar 69. The large brush 67 will throw the tops over toward the narrower brush 68 and this latter brush which is rotated at very high speed further throws the tops with great force in contact with the rotary topping knives 59 by which the tops are severed at the requisite distance from the bud. The stalks of smallest height will be liberated first at the forward lower portion of the brushes 67 and 68 due to the inclined positioning of the same; while the tallest stalks will be liberated last or only at the higher rear portions of the brushes. The knives in like manner progress upwardly at a constant spacing from the brush 68, so that the topping is carried out uniformly, that is at the same distance from the bud irrespective of the length of stalk. In this connection advantage is taken of the tendency of the stalks caught between the brush 67, and bar 69 to seek a position with the length of the stalk disposed at right angles to the axis of the brush 67.

The brush 67 will cause the stalks to take up the position just referred to. This is accomplished while the butt is in the lower conveyor only and before it arrives and is doubly grasped by the upper conveyor which would then render it difficult for the stalk to take up any new position of inclination attempted to be imposed upon it by the action of the brush 67.

As soon as this right angle or angular position is taken up by the stalk with reference to the brush 67, the stalk moves into engagement with the second conveyor, which aids to more rigidly support it and carry it back to the rear of the machine. In this way the tops are all uniformly treated by the brush 67 and its bar 69. The topping is consequently uniform and standard. The brush 67 also has a separating and winnowing action on the stalks which are often received in clusters. The stalks are separated and shifted along separately by the brush 67 thus enabling each stalk to receive individual treatment as to topping.

The cutting apparatus is preferably preceded by a stripping and stalk supporting device composed of a frame 70 of any appropriate construction having mounted therein numbers of pairs of brushes 71 and 72. In the instance shown there are three such pairs of brushes, one pair being super-imposed above the other. The brushes are mounted on shafts 73 and 74 that are mounted substantially horizontally and have their axes extending substantially forwards and rearwards. The bristles or stock of each pair of brushes preferably touch or interlap. The frame is open both front and rear and at the bottom in line with the impinging inner portions of the bristles, the cane stalks gaining admission through the front portion of the frame and into the space between the rotary brushes 71 and 72, the brushes being conical, as indicated at 75 in Figure 1, to better receive the stalks. The rear open side of the frame is disposed adjacent the receiving end of the brush 67 and its bar 69.

Pairs of small flat brushes 76 and 77 with their axes substantially vertical are mounted in connection with the brushes 71 and 72 and their function is to engage the cane stalks when in the rear portions of the brushes 71 and 72 and hasten the disengagement of the stalks from said brushes 71 and 72. The front frame 70 is pivotally carried by the axles 21, so that it may move up and down. The front portion of this frame 70 is mounted upon the casters 78 which are swivelly carried by the frame and move along directly in contact with the ground yielding up and down in accordance with inequalities in the surface level. The side beams 15 of the main frame are continued outwardly as at 79 to embrace the lower beams 80 of the front frame 70. The extended ends 79 act to reinforce and support the sides of the front frame 70, which has a tendency to bulge out under the action of the cane stalks entering between the pairs of brushes 71 and 72. Lugs 81 are carried by the front frame in position to engage and rest upon the extension beams 79, whereby to prevent the forward portion of the front frame from descending to a too low level and to prevent the castors 78 getting in ditches and holes and quarter-drains from which they would not emerge without breakage.

The machine may be driven by any appropriate motive power and any suitable motor or motors may be employed to drive the various conveyors, topping mechanism and stalk stripping and supporting devices. For purposes of illustration, I have shown in the drawings an internal combustion engine 82 mounted, as illustrated in Figure 3, at one side of the rear portion of the auxiliary frame and having the crank shaft 83 journaled in appropriate bearings. A sprocket 84 on the crank shaft is arranged to receive a chain 85 which extends downwardly and is trained about a second sprocket 86 for driving the mechanism of the change-speed device 87. This device may be a usual form of transmission employed upon motor vehicles for driving the propeller shaft indicated at 88. In the propeller shaft are preferably included the universal joints 89 and 90 and a slip joint 91 for compensating for the relative vertical movement of the supplemental frame on which the power unit is mounted. The propeller shaft 88 is arranged to drive a differential 92 mounted upon the main frame. The driven transverse shafts from the differential are indicated at 93 and carry sprockets 94 coupled by the chains 95 to the larger sprockets 96, which are mounted upon the driving drums 18 of the endless tractors.

The crank shaft 83 of the engine is provided with a fixed pulley wheel 97 engaged by the twisted belt 98 by which power from the engine is transmitted to the small pulley 100 and the larger pulley 101, mounted on the shaft 107 journaled in the bracket 99. The belt 98 is engaged about the wheel 100 of smaller diameter, while the driven wheel 101 of larger diameter receives the twisted belt 102. This latter belt engages and drives a pulley 103 on the shaft of the topping brush 67. The shafts of both brushes 67 and 68 are extended outwardly and provided with sprockets 104 and 105, the same being engaged by the chain 106, whereby both brushes will be driven in the same direction. The sprocket for the topping brush 67 will be larger than the sprocket for the brush 68 in order to drive the latter brush at higher speed.

Figure 1:
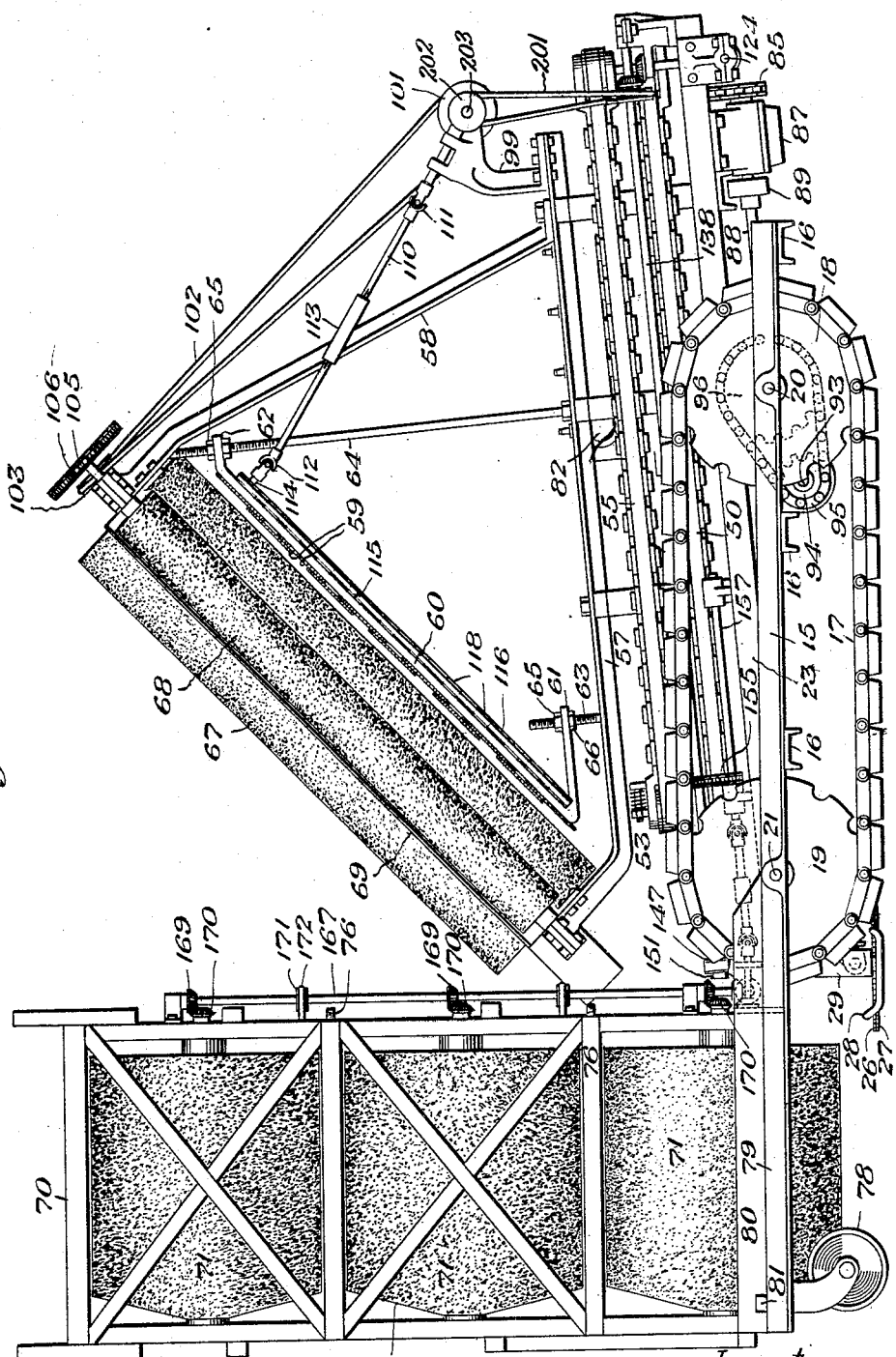

As shown in Figure 5, the shaft 138 is provided with a pulley 200 engaged by a twisted belt 201 which is also trained about a smaller pulley 202 on the shaft 203 carried in a bracket 204. On the shaft 203 is fixed a bevel pinion 108 meshing with a companion bevel pinion 109 fixed on the shaft 110. This shaft 110 is the rotary topping knife drive shaft and includes universal joints 111 and 112 and a slip joint 113 as shown in Figure 1 to permit of the adjustment of the topping knife assembly. The drive shaft 110 is coupled to a drive pulley 114, as shown in Figure 8. This drive pulley 114 is engaged by the belt 115 which is trained about the pulleys 116 upon the saw shafts 117 and the idler pulleys 118.

The crank shaft 83 of the internal combustion motor at its rear end is provided with a bevel pinion 119 disposed in mesh with a bevel pinion 120 on a vertical shaft 121. As shown in Figure 5, the lower end of the shaft 121 carries a fixed bevel pinion 122 meshing with a similar pinion 123 on the transverse shaft 124, which carries the pinions 125 and 126 for engaging with companion bevel pinions 127 and 128 upon the belt drive shafts 129 and 130. These belt drive shafts are provided with the driving drums 131 and 132 by which both lower and upper conveyor belts are driven. The transverse shaft 124, as shown in Figure 5, is provided also with a bevel pinion 133 engaging a bevel pinion 134 upon a vertical shaft 135 having a second bevel pinion 136, which meshes with the bevel pinion 137 on the shaft 138. This shaft 138 is mounted in appropriate bearings in the supplemental frame and extends forwardly for the purpose of transmitting motion to the rotary saws, rotary brushes and the stripping and stalk holding device. At the opposite side of the supplemental frame, namely at the ending side, is a similar line shaft 139 being an extension of the crank shaft of the engine 82. These shafts 138 and 139 are provided with pulleys 140 and 141 for connection to the twisted belts 142 and 143 which in turn engage the pulleys 144 and 145 upon the shafts 45 of the lowermost brushes 47.

As shown in Figure 2, the belt and pulley connection 146 is mounted between the shafts 45 and 46 of each pair of brushes 47 and 48, so as to drive the brush 48 from the shaft of the brush 47.

The line shafts 138 and 139 are also provided with the pulleys 147 and 148 for connection to the twisted belts 149 and 150. These belts engage the pulleys 151 and 152 on the shafts 41 of the rotary saws. The saws are thereby driven and with them are also driven the rotary pusher arms 153, which carry the saws and rotate therewith. These pusher arms are generally curved or are provided with the curved leading edges 154 with the outer tip portions sloping in the direction opposite to the direction of rotation. The function of these pusher arms is to force the lower portions of the severed stalks in toward the brushes 47.

The line shafts 138 and 139 are arranged to drive through the chain and sprocket mechanism 155 and 156 the counter shafts 157 and 158 journaled in appropriate bearings in the supplemental frame. These counter shafts extend forwardly and include universal joints 159 and 160 and the slip joints 161. At their forward ends the counter shafts carry the fixed bevel pinions 162 arranged to mesh with and drive the bevel pinions 163 on the cross shafts 164. These latter shafts are provided with the bevel pinions 165 meshing, as shown in Figure 4, with the bevel pinions 166 at the lower ends of the vertical drive shafts 167 and 168. Bevel pinions 169 fixed on the shafts 167 and 168 are disposed in mesh with similar companion bevel pinions 170 on the shafts of the rotary brushes 71 and 72. Pulleys 171 on the shafts 167 and 168 are engaged by crossed belts 172 for driving the pulleys 173 on the shafts of the brushes 76 and 77.

In operation, the machine progresses through the cane field at the selected speed, being driven by the internal combustion or other motor 82 through the selective transmission 87, which will be under the control of the operator of the machine in accordance with standard automobile practice. The endless tractors upon which the machine moves will enable the device to proceed over ground of rough or soft character, such as is usually encountered in cane growing countries. The advancing machine initially receives the stalks between the pairs of brushes 71 and 72 and should any of the stalks be beaten down or lying low, the same can be raised by the pilot shoes 174, which will lift and guide the fallen or bent stalks up into an erect position or into a position parallel with the line of travel of the machine whereupon, on advance of the machine, all of the stalks will come under the influence of the brushes 71 and 72. By virtue of the direction of their rotation, these brushes 71 and 72 will have a tendency to raise the fallen stalks and to hold the standing stalks in an upright position best suited to severing the same by the rotary knives 26 and 27. The brushes 71 and 72 also have the effect to strip the leaves from the stalks and to present the bare stalks to the cutting and topping mechanism. The stock of the brushes will preferably be of steel wire to sustain the great strains put upon same. The machine by its movement will bring the saws 26 and 27 which are rotating at a relatively fast speed into contact with the stalks. These stalks will be held in position by the brushes 76 and 77 against any tendency to back away from the knives during the severing operation. As this severed operation proceeds the severed butt ends of the stalks will come under the influence of the rotary pusher arms 153 by which they will be forced backwardly into engagement with the rotary brushes 47. These brushes due to their inclination will exert a lifting effect on the stalks. The stalks are passed along to the upper brushes 48 and into the receiving end of the lower conveyors 49, 50. At the same time the upper portions of the stalks are guided between the brush 67 and its bar 69. The stalk will then be made to assume the right angular position above referred to. Subsequently, the upper conveyors 55, 56 will engage the stalk just above the butt, and due to the action of the two conveyors and the rotary action of the brush 67 the stalk is carried rearwardly. The top portion of the stalk will be released from the brush 67 and bar 69 at a point governed by the height of the stalk, and promptly on its release the top will be pushed by the rotating brush 68 against the topping knives and the topping will take place in all cases at a predetermined distance from the bud which will be the same distance for all stalks irrespective of length.

The tops may be simply thrown over the side of the machine or collected in a receptacle supplied for the purpose. The stalks may be carried to the rear of the machine and dumped upon the field by the conveyors, or they may be collected in a trailer provided for this purpose.

It is obvious that various changes and modifications may be made in the details of construction and design of the above specifically described embodiment of this invention without departing from the spirit thereof, such changes and modifications being restricted only by the scope of the following claims.

What is claimed is:—

1. In a cane harvester, a vehicle, stalk-cutting means thereon, conveying means extending longitudinally in the vehicle for receiving the stalks from the cutting means, inclined topping means extending lengthwise above the conveying means, and inclined means for receiving the top portions of the stalks and moving same along with the conveying means whereby due to the inclination the tops of stalks of varying lengths will be released to the topping means at a variety of points to secure uniform topping.

2. In a cane harvester, a vehicle, stalk-cutting means thereon, conveying means for receiving the stalks from the cutting means and carrying the stalks lengthwise of the vehicle, inclined topping means extending lengthwise of and above the conveying means, inclined means for receiving the top portions of the stalks and moving same along with the conveying means whereby due to the inclination the tops of stalks of varying lengths will be released to the topping means at a variety of points to secure uniform topping, and means for forcing the tops of the stalks upon release against said topping means.

3. In a cane harvester, a vehicle, stalk-cutting means thereon, conveying means extending longitudinally of the vehicle for receiving the stalks from the cutting means, lengthwise extending inclined topping means above the conveying means, and inclined means for receiving the top portions of the stalks and moving same along with the conveying means whereby due to the inclination the tops of stalks of varying lengths will be released to the topping means at a variety of points to secure uniform topping, and a rapidly-rotating brush for throwing the released tops violently against said topping means.

4. In a cane harvester, a vehicle, stalk-cutting means thereon, conveying means for receiving stalks from the cutting means, inclined topping means above the conveying means, a rotary brush disposed with its axis on substantially the same inclination as the topping means and adjacent said topping means, and a bar located along side said brush for receiving between the bar and brush the top portions of the stalks and for releasing the same to the topping means selectively in accordance with the height of the stalk.

5. In a cane harvester, a vehicle, stalk-cutting means thereon, conveying means for receiving the stalks from the cutting means, inclined topping means above the conveying means, a rotary brush disposed adjacent said topping means and with its axis upon substantially the same inclination, a bar ranged along side said brush for receiving the tops of the cane between the bar and brush, and a second brush also disposed on an inclination adjacent said bar and between the bar and topping means for receiving the cane tops from between the bar and first named brush and for propelling the tops over against the topping means.

6. In a cane harvester, a vehicle, stalk-cutting means on the vehicle, conveying means for receiving the stalks from the cutting means, a bank of topping knives arranged diagonally above said conveying means, a brush of substantially large diameter having its axis disposed diagonally to one side and slightly above the topping knives, means for rotating said brush with its lower portion moving toward the topping knives, an inclined bar disposed along side the brush for pressing the top portions of the stalks against the brush, a second brush disposed below the bar and between the bar and topping knives for forcing the tops against the knives when released from between the bar and first named brush, and means for rotating the last named brush at high speed with its lower portion moving toward the topping knives.

7. In a cane harvester, a vehicle, stalk-cutting means thereon, conveying means for receiving the stalks from the cutting means, a series of rotary topping knives disposed diagonally above said conveying means, means for rotating said topping knives, a rotary brush of large diameter with its axis disposed diagonally adjacent the topping knives, an inclined bar adjacent the outer portion of the brush and at the side of the brush, a second brush of small diameter with its axis arranged diagonally between the bar and topping knives and at a lower elevation than said bar, and means for rotating both said brushes with the second named brush rotating at high speed.

8. In a cane harvester, a vehicle, a pivoted supplemental frame thereon, ground engaging means, carried by the frame to support the forward portion of the frame upon the ground, stalk-cutting means on the front portion of the supplemental frame, conveying means on the supplemental frame for receiving the stalks from the cutting means, and topping means carried by the supplemental frame above the conveying means.

9. In a cane harvester, a vehicle, a supplemental frame pivoted on the vehicle, means to support the forward portion of the supplemental frame directly on the ground, stalk-cutting means on the forward portion of the supplemental frame, conveying means on the supplemental frame in rear of the cutting means, intermediate means between said cutting means and conveying means for transferring the severed stalks to the conveying means, and lengthwise extending topping means carried by said supplemental frame above the conveying means for topping the stalks in the act of conveying the same rearwardly of the machine.

10. In a cane harvester, a vehicle, a supplemental frame pivoted thereon, means contacting with the ground for causing the supplemental frame to ride up and down to conform to the irregularities thereof and independently of the vehicle, stalk-cutting means carried by the forward portion of the supplemental frame, conveying means carried by the supplemental frame, rotary brushes on the supplemental frame between the cutting means and conveying means for transferring the butts of the severed stalks to the conveying means, and topping means carried by the supplemental frame for selectively topping the stalks as the same are conveyed rearwardly by said conveying means.

11. In a cane harvester, a vehicle, a supplemental frame pivoted near its rear end on said vehicle, ground-engaging means for movably supporting the forward portion of the supplemental frame independently of the vehicle, rotary stalk-cutting saws carried by the forward portion of said supplemental frame, curved pusher arms associated and rotated with said saws, conveying means carried by the supplemental frame, and means between said saws and the conveying means for transferring the butt portions of the severed stalks to said conveying means.

12. In a cane harvester, a vehicle, a supplemental frame pivoted at its rear portion upon the vehicle and having a link connection at its forward portion with the vehicle, standards having pins for engaging above and below the front portions of the supplemental frame, ground runners having shanks adjustably fitted in said standards, cutting means carried by the forward portion of the supplemental frame for severing the stalks of the cane, and conveying means on the supplemental frame for receiving the stalks from the cutting means.

13. In a cane harvester, a vehicle having endless tracks, means for driving said tracks, a supplemental frame pivoted on the vehicle, ground-engaging means for movably supporting the forward portion of the supplemental frame, stalk-cutting means carried by the forward portion of said frame, conveying means also carried by said supplemental frame for receiving the stalks from the cutting means, and selective topping means carried by the supplemental frame above said conveying means.

14. In a cane harvester, a vehicle, a relatively movable supplemental frame thereon, a pair of horizontal conveyor belts on the supplemental frame with their adjacent runs disposed together, means for applying yieldable pressure to said adjacent runs, means for forming a convergent mouth for the adjacent runs, cutting means on the supplemental frame, and topping means also on the supplemental frame above the adjacent runs of the conveyor belts.

15. In a cane harvester, a vehicle, a movably mounted supplemental frame thereon, stalk-cutting means on the supplemental frame, lower and upper conveying means on the supplemental frame, said lower conveying means adapted to receive the stalks from the cutting means, topping means on the supplemental frame for receiving the top portions of the stalks when the butt ends are received in the lower conveying means, said topping means adapted to shift the stalks to a position right angular thereto, said upper conveying means arranged to take hold of the stalks at a second point subsequent to the right angular arrangement of the tops above referred to.

EDWARD MURPHY.